United States Patent [19]

Masayuki et al.

[11] Patent Number: 4,572,727

[45] Date of Patent: Feb. 25, 1986

[54] CYCLONE

[75] Inventors: Kiyosawa Masayuki; Inoue Nobuaki; Sonoda Eiichi, all of Ube, Japan

[73] Assignee: Ube Industries, Ltd., Japan

[21] Appl. No.: 599,046

[22] Filed: Apr. 11, 1984

[30] Foreign Application Priority Data

Apr. 14, 1983 [JP] Japan ............ 58-64503

[51] Int. Cl.[4] ............ B04C 3/06; B01D 45/12

[52] U.S. Cl. ............ 55/414; 55/459 R; 55/DIG. 14; 209/144

[58] Field of Search ............ 55/392, 204, 410, 413, 55/414, 459 R, 459 A, 459 D, DIG. 14; 209/144; 422/147; 29/401.1

[56] References Cited

U.S. PATENT DOCUMENTS

| | | | |
|---|---|---|---|
| 1,066,704 | 7/1913 | Brassert | 55/413 |
| 1,344,146 | 6/1920 | Peck | 55/459 D |
| 1,752,231 | 3/1930 | Clarkson | 55/410 |
| 2,015,464 | 9/1935 | Saint-Jacques | 55/459 R |
| 2,896,744 | 7/1959 | Chapman | 55/392 |
| 2,913,110 | 11/1959 | Rogers | 209/144 |
| 4,397,071 | 8/1983 | Liller | 29/401.1 |

FOREIGN PATENT DOCUMENTS

| | | | |
|---|---|---|---|
| 138737 | 11/1979 | Fed. Rep. of Germany | 209/144 |
| 121453 | 6/1981 | Japan . | |
| 4645 | of 1908 | United Kingdom | 55/459 R |
| 376555 | 7/1932 | United Kingdom | 209/144 |

*Primary Examiner*—David L. Lacey

*Attorney, Agent, or Firm*—Townsend & Townsend

[57] ABSTRACT

A cyclone is disclosed, which comprises a cylindrical shell, an inverted conical hopper depending from the cylindrical shell, a cylindrical dust exhaust duct leading from the lower end of the inverted conical hopper, a gas supply duct extending tangentially or circumferentially of the cylindrical shell for introducing dust-containing gas into the cyclone, and a gas exhaust duct penetrating the top wall of the cylindrical shell with the lower end of the gas exhaust duct positioned below the top wall, and in which the peripheral wall of the cylindrical shell has a projecting side wall portion inwardly projecting into the cyclone and terminating in the joint of the inner side wall of the gas exhaust supply duct and the peripheral wall of the cylindrical shell. The cylindrical gas exhaust duct has a protruding portion, which smoothly protrudes sidewise from its lower end and has a diameter equal to or greater than the diameter of the gas exhaust duct. The overall end portion of the gas exhaust duct with the protruding portion thus has an oval or egg-like shape in horizontal section.

6 Claims, 7 Drawing Figures

CYCLONE

BACKGROUND OF THE INVENTION

This invention relates to cyclones and, more particularly, to an improvement in a cyclone, with which the pressure loss is reduced and the exhaust gas from the cyclone has a reduced residual dust concentration so that dust separation efficiency can be increased.

The vertical cyclone utilizes centrifugal force to separate and capture dust in gas, and it is extensively used for cement firing equipment and the like.

An example of the cyclone of this type is disclosed in Japanese Utility Model Application Laid-open No. 56-121453. In the disclosed cyclone, a cylindrical shell has a projecting peripheral wall portion inwardly projecting into the cyclone and terminating in the neighborhood of the joint of an inner portion of a gas supply duct and the cylindrical drum. The inwardly projecting peripheral wall portion has an effect of reducing the proportion of the whirling flow in the cyclone that strikes and joins a dust-containing gas stream introduced from the gas supply duct, thus reducing the pressure loss.

Even with this construction, however, dust particles of comparatively small diameters that have not been separated and brought to the periphery of the cylindrical shell reach and strike the inwardly projecting vertical wall portion thereof to disturb the status of flow of dust, so that part of the dust is introduced into and carried along by the exhaust gas being exhausted through a gas exhaust duct, thus lowering the dust separation efficiency of the cyclone. This shortcoming imposes restrictions on the extent to which the projecting wall portion projects into the cylinder, so that the effect of pressure loss reduction has been insufficient.

In addition, the gas exhaust duct is provided concentrically with the cylindrical shell, so that the space defined between the cylindrical shell and gas exhaust duct has a substantially constant cross-sectional area in the axial direction. Therefore, gas whirls in the space at a substantially constant speed, and no substantial axial velocity component is given. The stream of gas and dust thus whirls along the space a large number of revolutions, leading to high frictional resistance between downward and upward whirling gas streams and consequent high pressure loss. Besides, many revolutions lead to a long retention time of dust in the cyclone, thus increasing the quantity of residual dust in the cyclone to increase the quantity of dust carried along by the exhaust gas and to lower the dust separation efficiency of the cyclone.

SUMMARY OF THE INVENTION

The invention has been intended to overcome the drawbacks discussed above, and its object is to provide an improved cyclone which can reduce the pressure loss and increase the dust separation efficiency.

According to the invention, there is provided a cyclone which comprises a cylindrical shell, an inverted conical hopper depending from the cylindrical shell, a cylindrical dust exhaust duct leading from the lower end of the inverted conical hopper, a gas supply duct extending tangentially or circumferentially of the cylindrical shell for introducing dust-containing gas into the cyclone, and a gas exhaust duct penetrating the top wall of the cylindrical shell with the lower end of the gas exhaust duct positioned below the top wall, the peripheral wall of the cylindrical shell having a projecting side wall portion inwardly projecting into the cyclone and terminating in the joint of the inner side wall of the gas supply duct and the peripheral wall of the cylindrical shell, wherein the cylindrical gas exhaust duct has a protruding portion which smoothly protrudes from the lower side wall of the gas exhaust duct and has a diameter equal to or greater than the diameter of the gas exhaust duct, the overall end portion of the gas exhaust duct with the protruding portion thus having an oval or egg-like shape in horizontal section.

DESCRIPTION OF THE PREFERRED EMBODIMENT

Figure 1:
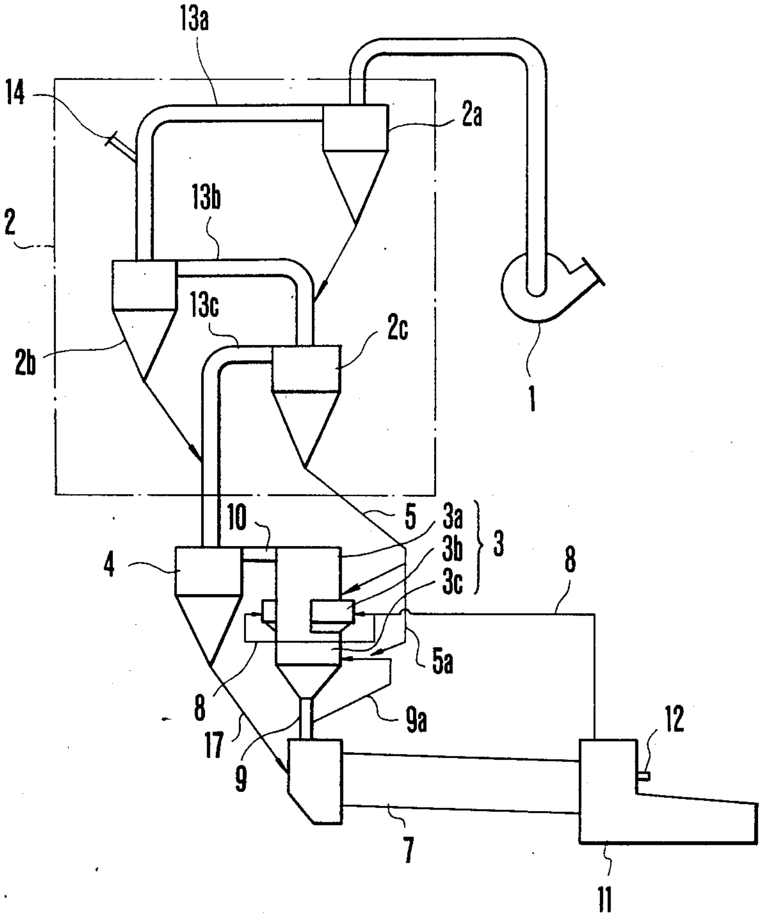
FIG. 1 is a schematic view showing a cement firing equipment exemplarily incorporating a cyclone embodying the invention.

Now, a cement firing equipment which exemplarily incorporates a cyclone embodying the invention will be described with reference to FIG. 1. Referring to the Figure, reference numeral 1 designates an exhaust fan, 2 a material preheater, 3 a calciner, 4 a cyclone separator, 7 a rotary kiln, and 11 a clinker cooler.

The material preheater 2 is of a well-known type, consisting of a combination of a plurality of cyclones, i.e., an upper cyclone **2*a*, an intermediate cyclone 2*b* and a lower cyclone 2*c*. Reference numerals 13*a* to 13*c* designate exhaust gas ducts, and 14** a material supply duct.

The calciner 3 has a top chamber **3*a*, an intermediate chamber 3*b* and a lower chamber 3*c*.**

The bottom of the lower chamber **3*c* and an exhaust hot gas discharge end of rotary kiln 7 are connected by a kiln exhaust hot gas duct 9. A branch duct 9*a* branching from the kiln exhaust hot gas duct 9 is connected to the side wall of a cylindrical section of the lower chamber 3*c* of the calciner 3. The intermediate chamber 3*b* and clinker cooler 11 are connected by a combustion air supply duct 8**.

A calciner exhaust gas duct 10 tangentially extends from the top portion of the side or peripheral wall of the upper chamber **3*a* and is in communication with a gas inlet of the cyclone separator 4**.

A preheated material supply duct 5 extends from the bottom of the lower cyclone **2*c* and is led to the upper chamber of the calciner 3 and the branch duct 9*a*.**

Reference numeral 12 designates a burner provided on the rotary kiln, and 17 a material supply duct.

With the construction described above, powdery cement material is led to the material supply duct 14, which is connected to the exhaust gas duct **13*a* extending between the upper and intermediate cyclones 2$a$ and 2$b$ of the material preheater 2**. The material supplied is preheated as it proceeds through the upper, intermediate and lower cyclones, i.e., toward lower cyclones.

The material discharged from the lower cyclone 2$c$ of the material preheater 2 is split into two streams. One of the streams is led through the preheated material supply duct 5 to be charged through the peripheral wall of the upper chamber 3$a$ of the calciner 3 toward the top of the lower chamber 3$c$. The other stream of material is charged into the branch duct 9$a$ from the kiln exhaust gas supply duct and flows together with the kiln exhaust gas into the lower chamber 3$c$.

The material charged into the upper chamber 3$a$ from the peripheral wall thereof is dispersed by combustion air introduced as whirling flow from the combustion air supply duct 8, and it rises through the upper chamber 3$a$ while whirling along with the combustion air with the material density increased toward the inner peripheral wall of the chamber 3$a$ to reach the top thereof in time when the calcining reaction is completed.

The material supplied to the branch duct 9$a$ of the kiln exhaust gas supply duct 9 is dispersed in the exhaust hot gas stream discharged from the rotary kiln 7 to absorb heat of the high temperature exhaust hot gas, partly calcined while reducing the exhaust hot gas temperature to about 800° C., and introduced along with the exhaust hot gas as whirling flow into the lower chamber 3$c$.

The material, in the form dispersed in the kiln exhaust hot gas, introduced into the lower chamber 3$c$, rises in the form of whirling flow through the lower chamber 3$c$ to be further dispersed by combustion air supplied as whirling flow from the combustion air supply duct 8.

The vortex flow of the mixture of kiln exhaust hot gas containing material and combustion air is burnt, and the heat of combustion is immediately absorbed by the material, thus further promoting the calcining of the material so that a major proportion of the material is calcined.

The material dispersed in the exhaust hot gas in the lower chamber 3$c$ enters the upper chamber 3$a$ along with the rising whirling gas stream.

Meanwhile, the material introduced to the top of the lower chamber 3$c$ is dispersed together with the material rising from the bottom of the lower chamber 3$c$ in the rising whirling stream in the upper chamber 3$a$, and the mixture eventually reaches the top of the upper chamber 3$a$ and is mixed with the material from the lower chamber 3$c$.

The material which is substantially perfectly calcined in the calciner 3 is supplied along with the exhaust hot gas through the calciner exhaust gas duct 10 to the cyclone separator 4. In the cyclone separator 4, the calcined material is separated from the exhaust hot gas to be supplied through the material supply duct 17 to the rotary kiln 7, in which the material is subject to the final clinkering with fuel combustion supplied from the burner 12.

The clinker produced in the rotary kiln 7 is fed to the clinker cooler 11 for cooling and then supplied to the next process.

The cyclone which is used, for example, in the cement firing equipment as described above will now be described.

Figure 2:
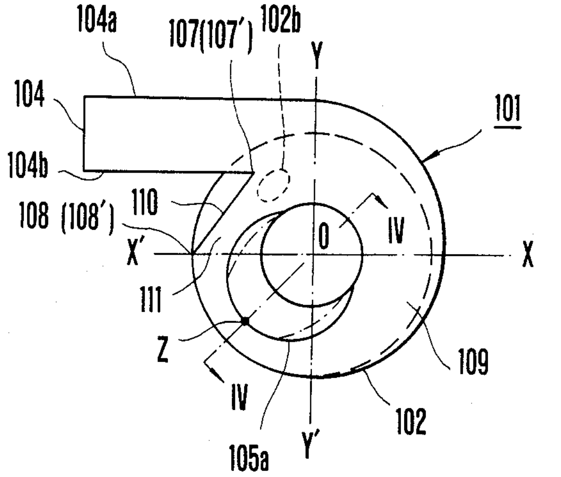
FIG. 2 is a plan view showing an embodiment of the cyclone according to the invention.
Figure 3:
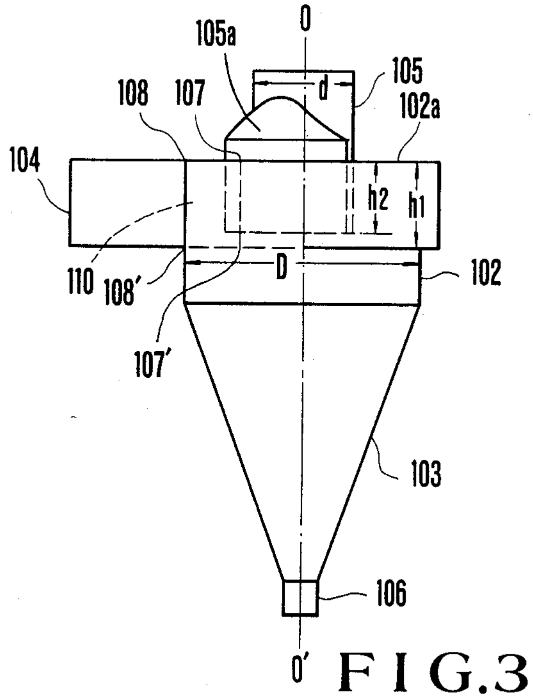
FIG. 3 is an elevational view of the cyclone shown in FIG. 2.

FIGS. 2 and 3 show an embodiment of the cyclone according to the invention.

Referring to the Figures, there is shown a cyclone 101 according to the invention. It comprises a cylindrical shell 102 and an inverted conical hopper 103 depending from the shell 102. A gas supply duct 104 having a rectangular sectional profile is provided at the upper periphery of the cylindrical shell 102 to extend horizontally and tangentially of the cylindrical shell 102. As shown in FIG. 2, the outer side wall 104$a$ of the gas supply duct 104 is gradually raised from the peripheral wall of the shell 102.

The peripheral wall of the cylindrical shell 102 includes a side wall portion 110 which terminates in the inner side wall 104$b$ of the gas supply duct 104. More particularly, as shown in FIG. 2, the side wall portion 110 projects from the rest of the peripheral wall of the cylindrical shell 102 into the interior of the cyclone, and its innermost end meets with the innermost end of the inner side wall 104$b$ of the gas supply duct 104 projecting into the cyclone.

The side wall portion 110 extends downwards from the top wall 102$a$ of the cylindrical shell 102. Its height is substantially equal to the height of the gas supply duct 104.

The upper and lower ends of the meeting line between the remaining peripheral wall of the cylindrical shell 102 and the wall portion 110 are designated at 108 and 108', respectively. The upper and lower ends of the meeting line between the inner side wall 104$b$ of the gas supply duct 104 and the wall portion 110 are designated at 107 and 107', respectively.

A gas exhaust duct 105 penetrates the top wall 102$a$ of the cylindrical shell 102 so that the lower end of the duct 105 is positioned below the top wall 102$a$. A dust exhaust duct 106 is provided at the bottom of the inverted conical hopper 103.

The structure described so far is substantially the same as that of a cyclone which is disclosed in, for instance, Japanese Utility Model Application Laid-open No. 56-121453 mentioned previously.

With the structure described, the dust-containing gas introduced into the cyclone from the gas supply duct 104 becomes a whirling flow. In the dust-containing gas, the heavier dust experiences centrifugal force and is forced toward the inner periphery of the cylindrical shell 102 and inverted conical hopper 103 while falling into and through the inverted conical hopper 103 due to the gravitational force. In this way, the dust is separated and discharged through the dust exhaust duct 106.

Meanwhile, the gas which is lighter in weight, falls through the inner part of the whirling stream and turns to rise in the neighborhood of the lower end of the inverted conical hopper 103 to be exhausted through the gas exhaust duct 105.

Where the structure as described is adopted, the dust-containing gas introduced into the cyclone is turned to a whirling stream for separation into dust and gas by the centrifugal force, with the dust being forced toward the inner periphery of the cylindrical shell and inverted conical hopper and thus separated from the rest of the stream.

The cyclone according to the invention is featured by a substantially cylindrical protruding portion 105$a$ of the gas exhaust duct 105. The protruding portion 105$a$ smoothly protrudes from the side wall of a lower end portion of the gas exhaust duct 105 extending into the cylindrical shell 102, so that the lower end of the gas exhaust duct 105 inclusive of the protruding portion 105*a* has an oval or egg-shaped sectional profile in a horizontal section.

Figure 4:
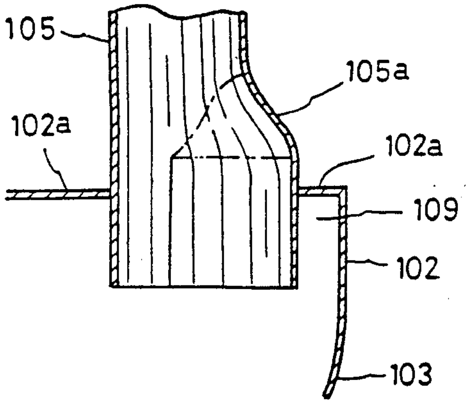
FIG. 4 is a sectional view, to an enlarged scale, taken along line IV—IV in FIG. 2.

More specifically, the protruding portion **105*a* has a closed top and has a diameter equal to (as shown at phantom line in FIG. 2) or greater than the diameter of the gas exhaust duct 105, and it smoothly protrudes from and communicates with the lower end portion of the gas exhaust duct 105. Consequently, the horizontal lower end of gas exhaust duct 105 with the sidewise protruding portion 105*a* has an oval or egg-like shape. FIG. 4 is a sectional view of the lower end portion of the gas exhaust duct 105 with the sidewise protruding portion 105*a***.

Preferably, the outermost part Z of the sidewise protruding portion **105*a* should lie in a quadrant area defined by line segments X'O and OY', and more preferably the vertical peripheral wall of the protruding portion 105*a* is substantially parallel with the wall portion 110 noted above. With this arrangement, the major axis line, OZ, of the protruding portion 105*a* is made substantially parallel to the side wall portion 110 to define a narrow space 111 between the peripheral wall of the protruding portion 105*a* and the wall portion 110**.

Thus, since the major axis line OZ of the protruding portion **105*a* is arranged to be substantially parallel with the side wall portion 110 with ∠ZOY'=45° held to thereby provide the oval or egg-like shaped horizontal sectional profile for the lower portion of the gas exhaust duct 105 integral with the protruding portion 105*a*, not only the space 109 defined between the outer peripheral wall of the lower portion of the gas exhaust duct 105 and the inner peripheral wall of the cylindrical shell 102 becomes gradually narrowed as it proceeds from the gas inlet portion of the cylindrical shell to the outermost part Z of the protruding portion 105*a* but also the horizontal travelling distance of gas within the space 109** becomes sufficiently large. Consequently, the separation can be effected efficiently with the embodiment described above.

In FIG. 2, line XOX' extends parallel to the gas supply duct 104 and passes through the center of the cyclone, and line YOY' is a perpendicular line to the line XOX' and passes through the cyclone center.

Figure 6:
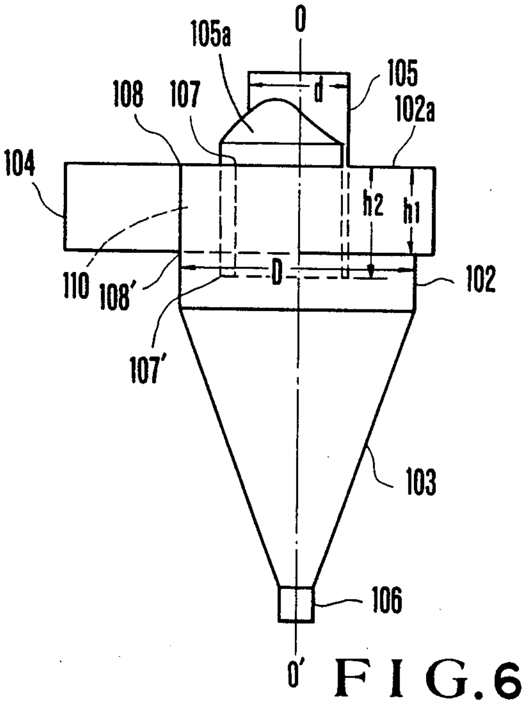
FIG. 6 is a view similar to FIG. 3 illustrating an alternate embodiment of the invention

An example of dimensions of main parts of the cyclone according to the invention is as follows. The diameter d of the gas exhaust duct 105 is d=(0.4 to 0.6)D where D is the diameter of the shell 102. The height, h1, of the gas supply duct 104 is h1=0.5 D. The height, h2, of the protruding portion **105*a* and the gas exhaust duct 105 within the duct 104 is h2 =(0.1 to 0.8)D. In FIG. 3, the gas exhaust duct 105 and protruding portion 105*a* are shown having respective lower ends flush with each other, but the lower ends need not be flush. Further, the flush lower end is shown located slightly above the lower end of the gas supply duct 104, but is may be located slightly below the lower end meeting the lower end 108' as illustrated in FIG. 6**.

With the improved cyclone according to the invention, as described above, the space 109 defined between the periphery of the gas exhaust duct 105 with the protruding portion **105*a* and the peripheral wall of the cylindrical shell 102** is progressively reduced.

Thus, the dust-containing gas introduced into the cyclone from the gas supply duct 104 is given a velocity component in the axial direction, that is, it tends to more readily flow toward the inverted conical hopper 103 owing to less resistance against flow than that offered by the narrow space 109. Thus, while the heavier dust is forced by centrifugal force toward the inner periphery of the cylindrical shell 102, its descent is promoted, with the result that the quantity of dust flowing toward the vertical wall portion 110 that projects inwardly from the rest of the peripheral wall of the cylindrical shell 102 is reduced. Thus, the amount of dust carried along with the exhaust dust is reduced, so that the separation effect is improved.

In addition, since the gas stream whirling in the space 109 is given downward force, the number of revolutions of the gas stream in the cyclone is reduced to decrease the friction between the whirling gas stream on the descent and the whirling gas stream on the ascent, thereby reducing the pressure loss.

Further, since the whirling gas stream experiences the additional downward force while it whirls in the space 109, the proportion of its portion that strikes and joins the dust-containing stream introduced from the gas supply duct 104 in the neighborhood of the juncture **102*b* between the gas supply duct 104 and cylindrical shell 102** is further reduced to promote the improvement of the separating effect and reduction of the pressure loss.

Furthermore, the downward whirling gas stream has an effect of downwardly withdrawing the dust directed to the vertical wall portion 110, thus suppressing the short cut of the dust to the gas exhaust duct 105. It is therefore possible to increase the extent to which the vertical wall 110 projects from the rest of the peripheral wall of the cylindrical shell 102 into the cyclone, for promoting the reduction of pressure loss.

The gas stream U-turning upwards in the neighborhood of the lower end of the inverted conical hopper 103 is exhausted through the gas exhaust duct 105. In this case, since, as mentioned earlier, the lower end of the gas exhaust duct 105 has not only an increased sectional area but also an oval or egg-like shape defined by the provision of the sidewise protruding portion **105*a***, the whirling force of the gas passing through this zone is reduced to reduce pressure loss.

Figure 5A:
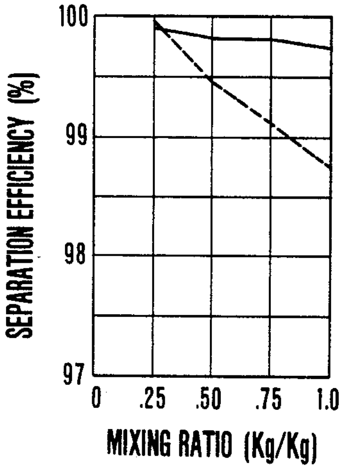
FIGS. 5A and 5B are graphs showing results of experiments conducted with the embodiment of the cyclone according to the invention, with FIG. 5A showing the dust separation efficiency plotted against mixing ratio and FIG. 5B showing the pressure loss plotted against the mixing ratio.
Figure 5B:
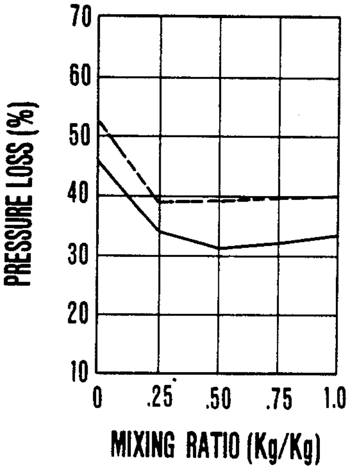

FIGS. 5A and 5B show the dust separation efficiency and pressure loss obtained according to the invention. In the graphs, the abscissa is taken for the mixing ratio $$\left(\frac{\text{dust weight (kg)}}{\text{dust-containing gas weight (kg)}}\right),$$

and the ordinate is taken for the dust separation efficiency in FIG. 5A and the pressure loss in FIG. 5B.

In the graphs, solid plots represent the results obtained with the embodiment of the invention and dashed plots represent the results obatained with the prior art cyclone, evidencing superiority of the present invention to the prior art.

As has been made obvious in the foregoing, the cyclone according to the invention is different from the prior art cyclone of the type with a cylindrical shell having a peripheral wall portion projecting into the cyclone interior, in that the gas exhaust duct 105 is provided with the sidewise protruding portion **105*a*, with the inwardly projecting peripheral wall of the cylindrical shell and the periphery of the augmented part of the exhaust gas duct with the sidewise protruding portion being in such a mutual relation that the narrow space 109** is defined between the two. This arrangement not only promotes the separation of dust toward the periphery of the cyclone, but also has outstanding effects of reducing the number of revolutions of gas stream in the cyclone, reducing the proportion of the whirling flow in the cyclone that strikes and joins the introduced dust-containing gas stream and promoting the descent of dust through the cyclone, thus reducing pressure loss and improving the dust separation efficiency.

While, in the above embodiment, the invention has been described by way of a cyclone with a cylindrical shell having an inwardly projecting peripheral wall portion, the gas exhaust duct with the sidewise protruding portion according to the invention is also applicable to the ordinary cyclone without inwardly projecting cylindrical shell peripheral wall to obtain the same effects.

What is claimed is:

1. In a cyclone comprising a cylindrical shell, an inverted conical hopper depending from said cylindrical shell, a cylindrical dust exhaust duct leading from the lower end of said inverted conical hopper, a gas supply duct extending tangentially or circumferentially of said cylindrical shell for introducing dust-containing gas into the cyclone, and a cylindrical gas exhaust duct penetrating the top wall of said cylindrical shell with the lower end of said gas exhaust duct positioned below said top wall, the peripheral wall of said cylindrical shell having a projecting side wall portion inwardly projecting into the cyclone and terminating in the joint of the inner side wall of said gas supply duct and the peripheral wall of said cylindrical shell, the improvement wherein said cylindrical gas exhaust duct has a protruding portion smoothly protruding from the lower side wall of said gas exhaust duct and having a diameter at least equal to the diameter of said gas exhaust duct, the lower surface of said cylindrical gas exhaust duct (105) being flush with that of said protruding portion, said lower surfaces being lower than the top wall (102*a*) of the cylindrical shell (102), and the upper surface of said protruding portion being higher than the top wall of the cylindrical shell.

2. The cyclone according to claim 1, wherein said protruding portion has the same diameter as said gas exhaust duct and the overall lower end portion of the gas exhaust duct with the protruding portion has an oval shape in horizontal section.

3. The cyclone according to claim 1, wherein said protruding portion has a diameter greater than the diameter of said gas exhaust duct and the overall lower end portion of the gas exhaust duct with the protruding portion has an egg-like shape in horizontal section.

4. The cyclone according to claim 1, wherein said protruding portion is positioned and arranged such that its major axis line is substantially parallel with said inwardly projecting side wall of said cylindrical shell to define a narrow space therebetween.

5. The cyclone according to claim 1, wherein the lower end of said gas exhaust duct and protruding portion is located above the lower end of said gas supply duct.

6. The cyclone according to claim 1, wherein the lower end of said gas exhaust duct and protruding portion is located slightly below the lower end of said gas supply duct.

* * * * *